United States Patent [19]

Reynier et al.

[11] Patent Number: 5,410,117
[45] Date of Patent: Apr. 25, 1995

[54] DEVICE AND CONTROL PROCESS FOR EDM MACHINING WITH AN ELECTRODE-WIRE

[75] Inventors: Alain Reynier, Ferney-Voltainre; Jean-Michel Bosson, Annemasse, both of France; Lorenzo Crivelli, Vernier/Ge, Switzerland

[73] Assignee: Charmilles Technologies S.A., Meyrin, Switzerland

[21] Appl. No.: 64,784

[22] Filed: May 19, 1993

Related U.S. Application Data

[63] Continuation of Ser. No. 465,050, Jan. 16, 1990, abandoned.

[30] Foreign Application Priority Data

Jan. 13, 1989 [CH] Switzerland .................. 00098/89

[51] Int. Cl.⁶ .................. B23H 7/02; B23H 7/04; B23H 7/20
[52] U.S. Cl. .................. 219/69.12
[58] Field of Search ............ 219/69.12, 69.13, 69.17, 219/69.18, 69.14

[56] References Cited

U.S. PATENT DOCUMENTS

| | | | |
|---|---|---|---|
| 4,081,652 | 3/1978 | Jänicke et al. | 219/69.12 |
| 4,363,948 | 12/1982 | Itoh | 291/69.12 |
| 4,510,366 | 4/1985 | Inoue | 219/69.12 |
| 4,581,513 | 4/1986 | Obara et al. | 219/69.12 |
| 4,607,149 | 8/1986 | Inoue | 219/69.12 |
| 4,703,143 | 10/1987 | Okubo et al. | 219/69.12 |
| 4,798,929 | 1/1989 | Itoh | 219/69.12 |
| 4,800,248 | 1/1989 | Futamura et al. | 219/69.18 |
| 4,868,760 | 9/1989 | Obara | 219/69.12 |
| 4,888,462 | 12/1989 | Diot et al. | 219/69.12 |
| 4,970,362 | 11/1990 | Ono | 219/69.12 |

FOREIGN PATENT DOCUMENTS

| | | | |
|---|---|---|---|
| 54-43394 | 4/1979 | Japan | 219/69.13 |
| 59-76724 | 5/1984 | Japan | 219/69.12 |
| 61-173817 | 8/1986 | Japan | 219/69.17 |

Primary Examiner—Geoffrey S. Evans
Attorney, Agent, or Firm—Gifford, Groh, Sprinkle, Patmore and Anderson

[57] ABSTRACT

At least one machining parameter of an electrode-wire EDM machine, cutting according to a predetermined trajectory, is varied when the electrode-wire reaches the apex of an angle or approaches an arc. The strategy consists of the following stages:

1) calculation of the locations along the trajectory or path at which these variations must be started;
2) stopping of relative electrode-wire movement and the work-piece, when the wire reaches one of these points;
3) gradual and stepped variations of the parameter up to a final designated value or until a predetermined number of steps have been performed;
4) resumption of wire-part relative movement, with the new parameter value over a computer predetermined distance, and
5) variation of the parameter in the opposite direction so as to return it to its initial value.

The step durations are slaved to changes of a factor giving an image of the conditions existing in the machining slot, around a predetermined threshold.

15 Claims, 4 Drawing Sheets

DEVICE AND CONTROL PROCESS FOR EDM MACHINING WITH AN ELECTRODE-WIRE

This is a continuation of application Ser. No. 07/465,050 filed on Jan. 16, 1990, now abandoned.

This invention deals with a device and a control process for an EDM machine with an electrode-wire, using automatic modification, at certain moments in the machining process, of at least one machining parameter.

Most known methods (for example CH 590.107, U.S. Pat. No. 4,703,143, EP 67 876, Japanese publications 51-85 589, 58-40229, 58-28 430) make therefore use of machining speed modification.

But all these methods do not diminish the fault appearing just after the apex of the angles; Swiss patent 654.233 also recommends decreasing the machining speed prior to reaching the apex of an acute angle, and to conserve reduced machining speed for a predetermined period of time after having passed the apex.

The regulation of the machining speed disclosed in the state of art is generally obtained:

either without or interrupt the machining, gradually by maintaining the wire feed, or in only one step after having stopped the wire feed.

For example, it has been proposed to vary the machining speed either gradually, and during a given time period (CH 654.233) or over a predetermined length of the path followed (JP 58-40229), while maintaining wire feed, or by stopping wire feed, and modifying the speed or rate and machining for a predetermined time, at a reduced rate and stationary machining in the case of an angle, or machining at low speed in the case of an arc; this speed or duration is calculated according to the slack of the wire along a straight line, which is determined by stopping machining (EP 67 876), or this period is that demanded for disappearance of slack (U.S. Pat. No. 4,703,143).

None of these publications mentions that it is advantageous to vary the speed or rate gradually, even if this variation is obtained during stationary machining.

It seems that the experts expect these gradual modifications of a parameter during the stop of the wire feed would demand too much time and increase therefore the time required for machining. It is for this reason, and in particular when machining at high speed, the state of the art, for example U.S. Pat. No. 4,725,706 recommends sudden changes in rate, and never associates feed stoppage with a gradual simultaneous variation of a parameter.

The purpose of the present invention is automatic regulation of at least one machining parameter, enabling more rapid machining than with known methods while avoiding breakage of the wire and obtaining adequate precision in the corners of machining parts.

This regulation should enable satisfactory geometry to be obtained, whether the trajectory presents convex or concave curves or broken lines with inside or outside edges.

BRIEF DESCRIPTION OF THE DRAWINGS

A better understanding of the present invention will be had upon reference to the following drawings, in which.

Figure 1:
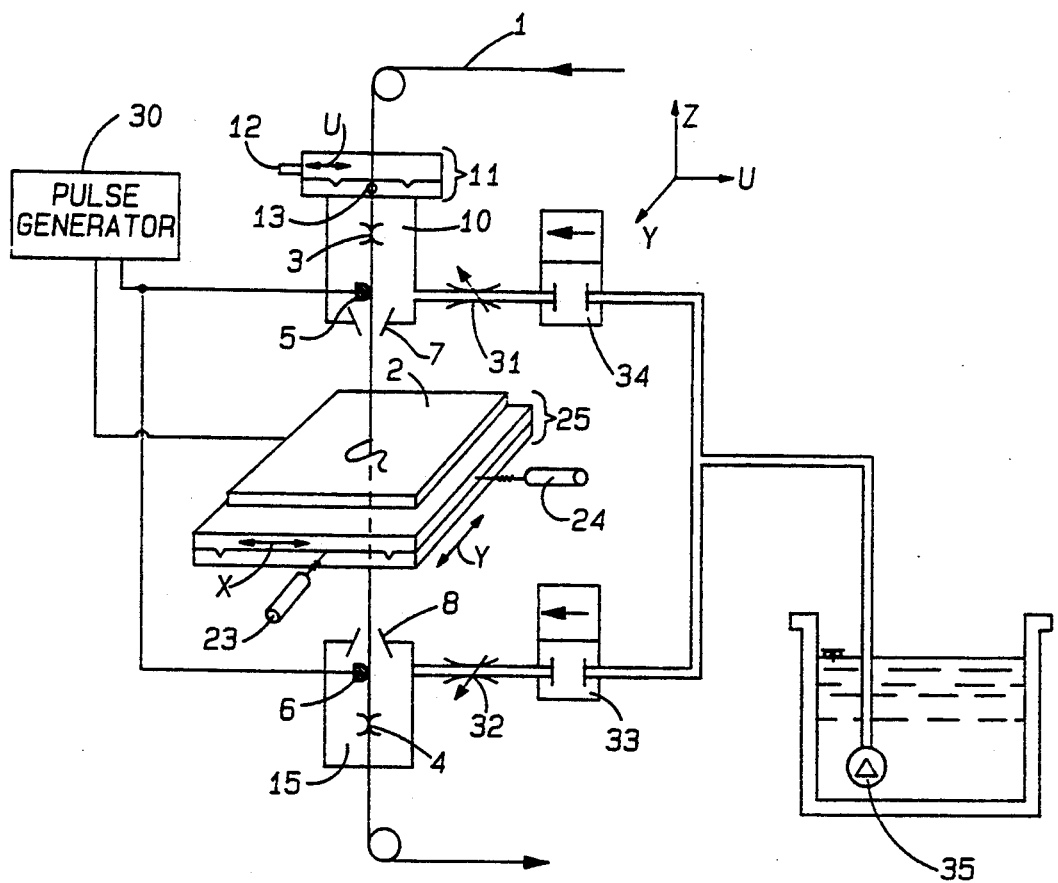
FIG. 1 is a schematic of an electrode wire EDM machine utilizing the control device of the present invention for machining a part along a desired trajectory.
Figure 1:
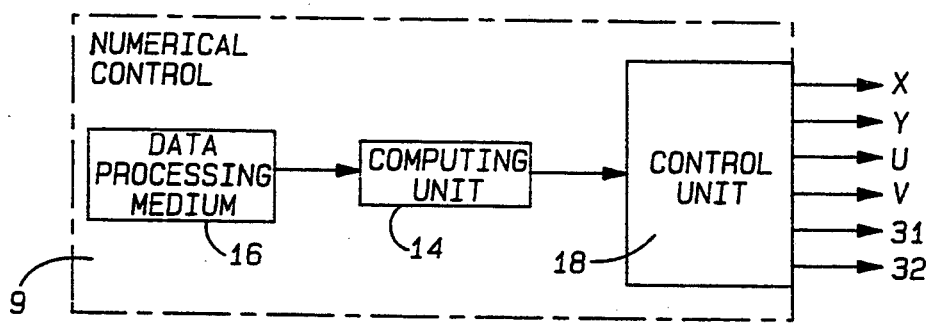

Let us briefly review the operation of an electrode-wire EDM machine, such as that illustrated in FIG. 1:

an electrode-wire 1 passes continuously between two wire guides 3 and 4 arranged on either side of the part to be machined 2, due to mechanisms (not shown) driving the wire while braking it so as to provide it with a predetermined mechanical tension. Two rubbing contacts 5 and 6 conduct the machining current, emitted by pulse generator 30, to the electrode-wire, while two injection nozzles 7 and 8 direct the machining liquid jets along wire 1 and into the slot cut in part 2 by the wire;

wire guide 3, nozzle 7, and upper contact 5 are arranged in work head 10, mobile along the vertical axis Z, and, in general, also mobile (along relatively short travels) in a horizontal plane, according to two orthogonal axes U and V, enabling the wire to be inclined, while the lower wire guide 4 remains fixed. This movement (U, V) is obtained by a crossed movement table 11, actuated by a servo mechanism (of known type, but not shown) including the two motors 12 and 13. The bottom work head 15 containing the lower wire guide 4, lower nozzle 8 and lower contact 6, remains fixed with respect to the machine structure;

the part to be machined 2 is attached by its mechanism, not shown, to a table which is itself attached to the bottom of the work tank (not shown) filled with the machining liquid. The latter is mobile according to two horizontal and orthogonal axes X and Y by means of a crossed movement table 25, actuated by a servo mechanism (of known type, not shown) including two motors 23 and 24;

the cutting trajectory is stored on a data processing medium 16, which sends its data to computer unit 14 of numerical control 9. The latter also features an appropriately programmed unit, at least one memory and a drive, together with installation 18 (processor or interpolator) monitoring and controlling the relative movements between the workpiece 2 and electrode-wire 1, by actuating motors 12, 13, 23 and 24, and monitoring other machining parameters such as machining liquid injection pressure, by activating solenoid valves 31 and 32. The computing unit 14 evaluates the cutting trajectory and sends control signals to interpolator 18 intended to distribute the movements along both directions X and Y, activated by motors 23 and 24;

the pulse generator 30 is connected between two electrodes 1 and 2 so as to emit successive voltage pulses intended to start discharges in the machining area. It receives signals from numerical control 9 (link not shown) for example, to control a given variation in pulse frequency, voltage or spark duration; and the dielectric tank feeds the work tank and the injection circuits to nozzles 7 and 8 of the work heads. These are shown diagrammatically in FIG. 1 by pump 35 and solenoid valves 31 and 32 connected to the liquid distributor valves 33 and 34.

The objective mentioned above is obtained by using the following strategy to gradually vary the parameter to be modified, this modification being, for example, a decrease:

the relative movement between the wire and the part is stopped, but the generator continues sending pulses into the wire;

this stoppage causes variation of a second parameter which evolves asymptotically towards a given limit, and this variation is followed by means of an appropriate device;

as soon as the second parameter has reached a reference value (during its evolution towards an asymptote), the value V of the parameter to be modified, for example generator pulse frequency, is decreased by a given quantity Q;

this variation causes a variation of the second parameter, which then gradually returns to its reference value and the gap is reestablished;

the first parameter is again decreased by a quantity Q', and so on until this first parameter is reduced to value V(X), after n decrements;

the relative movement between the wire and the workpiece is restarted; the modified parameter being in general a factor of the discharge power, its reduction results, in this case, in a decrease of the feed rate obtained automatically by the servo-mechanisms actuating the relative movement;

machining is continued at this reduced rate over distance lo of the trajectory;

without it being necessary to stop the relative movement, the value of the parameter is increased by a given quantity Q''. This causes a variation in the second parameter, which then returns gradually to its reference value, a stable machining being a new established in the gap; the strategy proceeds in that manner by n' successive increases;

when the parameter has reached value V again, machining is continued at the initial rate.

In this manner, a double gradual variation of the machining rate has been obtained in steps, this variation being slaved either to reaching of the scheduled reference machining conditions, or to a return to stable machining after each elementary variation. The durations of these steps are determined by the times taken by the successive returns to reference or stable machining conditions. Quantities Q, Q', Q'' can also be different for each of the decrements and increments (elementary variations) performed. These quantities can be sufficiently low (and the steps sufficiently numerous) for the variation to be gradual and practically continuous. The drop in rate and the reduced corresponding valve V(x) of the parameters are such, in particular, that the wire slack has decreased sufficiently to be acceptable, i.e. so that the geometry defects, partly due to this slack, have disappeared or have become acceptable, in terms of the required precision. But this is only one of the consequences of the machining rate variation obtained.

It should also be stated that the strategy described above can also be used to increase a parameter in steps (for example wire mechanical tension).

As in patent CH 654.233, the device of the present invention can be used to gradually modify parameter having an effect on geometry, such as the frequency of the pulses emitted by the generator, and to measure the mean machining voltage. But, instead of varying the discharge frequency according to a predetermined time function, proceeding by steps of predetermined durations, the duration of the discharge frequency variation steps (or of another parameter affecting the geometry, for example affecting pulse power) is no longer determined. The mean machining voltage is allowed to stabilize at a predetermined threshold after each of these variations before proceeding to the next variation.

Therefore, it is the time taken for the successive stabilizations which represent the step durations:

instead of decreasing the parameter and continuing wire feed, this variation is performed in the stationary mode. Therefore, it is no longer necessary to correct the feed speed as a function of the successive values of mean machining voltage, so as to keep the sparking distance constant, since the feed rate is null;

instead of reducing the feed speed already on approaching the apex of an angle, the feed speed is not reduced until after the apex.

Surprisingly, this process of interrupting the wire feed and varying the machining conditions in steps in the stationary mode significantly reduces the machining times of an edge or arc, with automatic variation in parameters with respect to machining operations performed with a procedure in which the variation is made during wire feed.

Generally, the first parameter is one of the machining mode factors, in particular the power of the pulses emitted by the generator, such as the frequency of these pulses, machining current, sparking time or sparking voltage. Preferably, this variation can be accompanied by that of one or more other parameters, for example variation in liquid injection pressure and/or wire mechanical tension and/or wire speed of movement. In particular, this enables the effect of the decrease in frequency on wire slack to be reinforced.

The second parameter providing an image of machining conditions is, for example, the mean machining voltage, the servo control voltage (difference between the mean reference voltage and the mean machining voltage), or the average spark ignition time.

The predetermined reference threshold reached by the second parameter at the end of each step may be its initial value at the moment of stopping the wire. In this case, the first step is cancelled, and a first decrease in parameter V is made as soon as the wire-part relative movement stops.

The quantities by which the first parameter is varied in each step, together with the number n or n+1 of these steps, the final value of V(X) reached by the parameter before cutting an angle, or the predetermined threshold reached by the second parameter at the end of each step were, for example, experimentally predetermined, choosing values giving a satisfactory geometry for the work part, with the fastest cutting of an arc or angle possible, while avoiding short-circuits. These values were stored on an appropriate data processing medium connected to the computing unit of the EDM machine numerical control. These are a function of the part material/electrode-wire material and geometry.

When cutting an arc, the greater the radius of curvature, the less it will be necessary to decrease the rate, and therefore the parameter so as to obtain correct geometry. It is possible to stop at an intermediate step corresponding to a reduced value V(x) of the first parameter, instead of continuing up to V(X). In other words V(x) and n depend on this radius; the higher the radius, the nearer V(x) to initial value V of the parameter and the smaller N; conversely, the shorter the radius, the nearer V(x) to value V(X) corresponding to cutting of an angle, and the greater n.

The term "angle" designates both a sharp edge and a rounded edge, the radius of curvature of which is of the same order of magnitude as the radius of the electrode-wire, or less than this radius. The points on the trajectory in which the automated appliance, which is the subject of the present invention, must be implemented are determined by an appropriately programmed computing element, fitted out to send a first signal activating starting of this automated device, i.e. stopping of the wire-part relvative movement, then a second signal, when the wire has travelled length $l_o$ along the path, machining with a first parameter reduced to value V(x). This second signal will actuate the beginning of successive increases in machining rate. Calculation of $l_o$ will be different for an arc or an angle.

According to a preferred option, in the case of an $\alpha$, the computing element is programmed to compute $l_o$ as being equal to:

$$l_o = \frac{\text{wire radius } R + \text{gap } g}{\tan \alpha/2}$$

Figure 2:
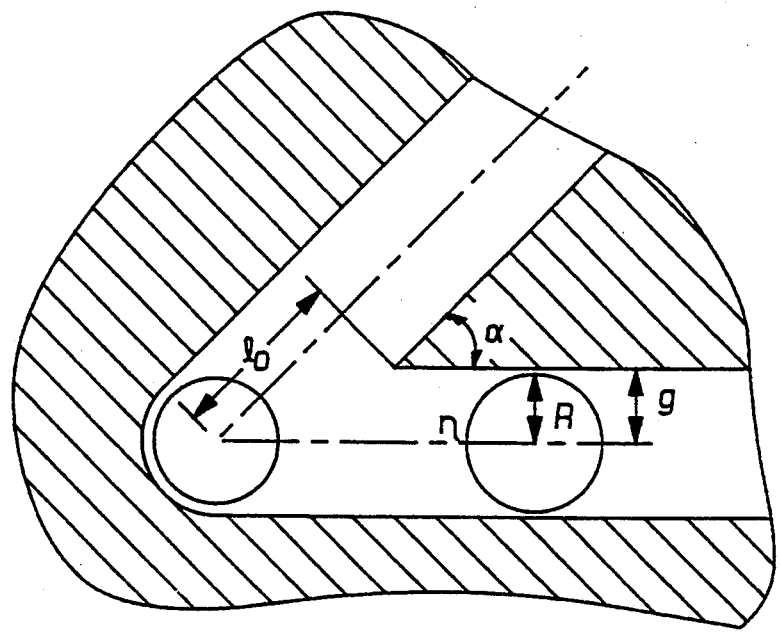
FIG. 2 is a partial view showing the machining of a corner of a workpiece utilizing the device of the present invention.
Figure 3:
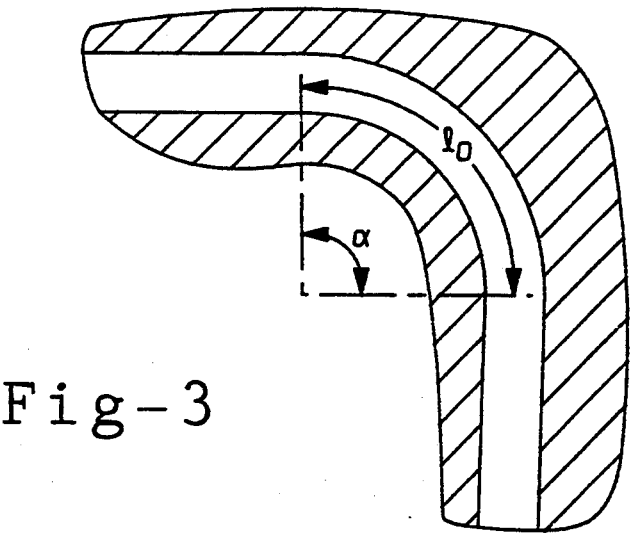
FIG. 3 is a partial view similar to that shown in FIG. 2 and illustrating the machining of an arc of a workpiece utilizing the device of the present invention.

(see FIG. 2);

in the case of an arc with a radius of curvature r, this computing element is programmed to compute $l_o$ as being equal to:

$$l_o = \gamma r,$$

where $\gamma$ is the angle, in radians, corresponding to this arc (see FIG. 3).

Therefore, $l_o$ depends only on the wire geometry and diameter, and not on the material of the electrodes and the thickness of the part.

Determination of $l_o$ and sending of signals A and B to the numerical control in order to actuate the gradual rate variation as slaved to return to stable machining are performed by the computing element without the intervention of a programmer. This element analyzes the trajectory or path stored (by being, in particular, programmed to follow changes in the radius of curvature of this trajectory) and to perform simple calculations such as those shown in the example above.

Below, the invention shall be illustrated by one of the possible applications, described solely as an example, but without being limited to this example.

According to this example, two parameters are varied: the pulse frequency and the injection pressure. The parameter giving an image of machining conditions is the mean machining voltage, obtained by integration over a certain number of succesive measures. Experimentally, if it was determined that the geometry is satisfactory and short-circuits are avoided in an angle for a reduced frequency F(X)=F/8, where F is the nominal machining rate pulse frequency, i.e. the rate used in machining before approaching this angle or an arc of low radius of curvature. Also, it was experimentally determined that at least 8 successive decreases are required to change from nominal frequency F to reduced frequency F/8, so as to cut an edge or angle of satisfactory geometry.

Figure 4:
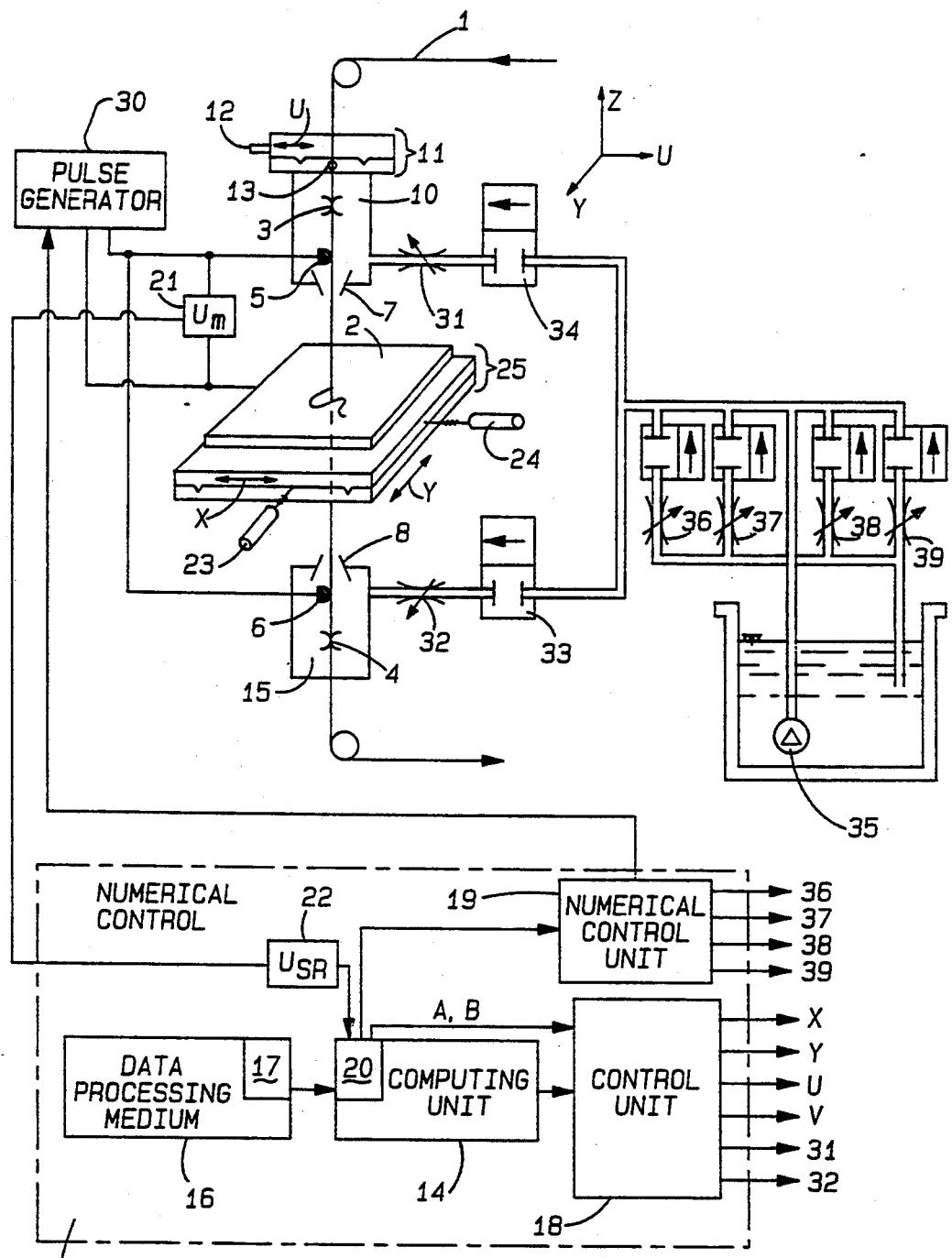
FIG. 4 is a view similar to FIG. 1 and showing an alternate arrangement between the control device and EDM machine for assisting in machining an angle in a workpiece.

Also, the relationship between the radius of curvature r of an arc and the corresponding reduced frequency value F(x), in which the number n of elementary variations, as shown in the table below, were also experimentally determined (and stored on element 17 of data processing medium 16 of the EDM maching, as shown diagrammatically in FIG. 4):

| r in mm | F(x) | n |
|---|---|---|
| 0 | F(X) = F/8 | 8 |
| 0 < r ≦ 0.5 | F(X) + Q1 = F/8 + $\frac{F - F/8}{8}$ | 7 |
| 0.5 < r ≦ 1 | F(X) + 2Q1 = F/8 + $\frac{2(F - F/8)}{8}$ | 6 |
| 1 < r ≦ 1.5 | F(X) + 3Q1 = F/8 + $\frac{3(F - F/8)}{8}$ | 5 |
| 1.5 < r ≦ 2 | F(X) + 4Q1 = F/8 + $\frac{4(F - F/8)}{8}$ | 4 |
| 2 < r ≦ 2.5 | F(X) + 5Q1 = F/8 + $\frac{5(F - F/8)}{8}$ | 3 |
| 2.5 < r ≦ 3 | F(X) + 6Q1 = F/8 + $\frac{6(F - F/8)}{8}$ | 2 |
| 3 < r ≦ 3.5 | F(X) + 7Q1 = F/8 + $\frac{7(F - F/8)}{8}$ | 1 |
| 3.5 < r | F(X) + 8Q1 = F | 0 |

Moreover, after having established the nominal machining rate to machine a given part, the machining voltage mean value Umr corresponding to this rate is determined and stored.

First of all, we shall describe machining of an angle (or edge) (see FIGS. 2 and 4): the wire machining the part at a rate such that the pulse frequency has value F and injection pressure value P, arrives at point O, the apex of the angle (i.e. the ideal line joining the two wire guides arrive at this point O); element 20 of computing unit 14, which is programmed for this purpose, sends a first signal A to control unit 18 of numerical control 9, which stops the relative wire-part movement.

The machining voltage Um is continuously measured by means of a measurement circuit 21 of known type, such as that described in patent CH 654 233. By means of a second circuit 22, the average $\overline{Um}$ is calculated and this value is compared to value $\overline{Umr}$ of this average obtained at the nominal rate. The error signal:

$$Usa = \overline{Um} - \overline{Umr}$$

increases gradually due to an increase in the gap resulting from stopping of the wire feed. This error signal is continuously determined by circuit 22. Step O ends when Usa reaches a predetermined threshold Usa/ref. Element 20 of computing unit 14 sends signal to unit 19 of numerical control 9, which activates an initial decrease Q1 in frequency f and Q2 in pressure p, such that:

$$Q_1 = \frac{F - F/8}{8} \text{ and } Q_2 = \frac{P - P/8}{7}$$

Preferably, a decrease in machining liquid injection pressure is obtained with one step less than for the pulse frequency, so that the variation in injection pressure is null when the last frequency variation occurs, thus decreasing the risk of short-circuits, the wire then offering minimum slack. This also provides maximum avoidance of the wire being offset on restarting (while it has not yet fully entered the material) and during machining of an angle. The pressure is controlled by a set of four solenoid valves 36 to 39 connected in parallel to the bypass of high pressure pump 35 taking the machining fluid from a tank up to the distribution network to injection nozzles 7 and 8 and the work tank.

When $\overline{Um}$ reaches its predetermined threshold again (i.e. when Usa=Usa/ref), circuit 22 sends a new signal (through element 20) to element 19 to decrement the frequency by quantity $Q_1$ and pressure by quantity $Q_2$ (step 1) again.

Frequency f and pressure p are thus decreased down to an injection pressure equal to P/8 and a frequency equal to F/8, therefore, for this example, after having made 8 elementary variations in frequency and 7 in injection pressure and having observed 8 steps. In some cases, a certain period is required for Usa to reach a value enabling wire feed. In such cases, 9 steps are observed. Having thus obtained this decrease in rate, circuit 22 sends a signal B (through element 20) to unit 18 of the numerical control which actuates the path for segment $l_o$ of the trajectory at low rate.

The EDM machine used in this example is fitted with a built-in automatic regulating circuit, used to slave the relative wire-part movement rate to Umr. Therefore, the speed at which the wire cuts $l_o$ is set automatically.

Figure 5:
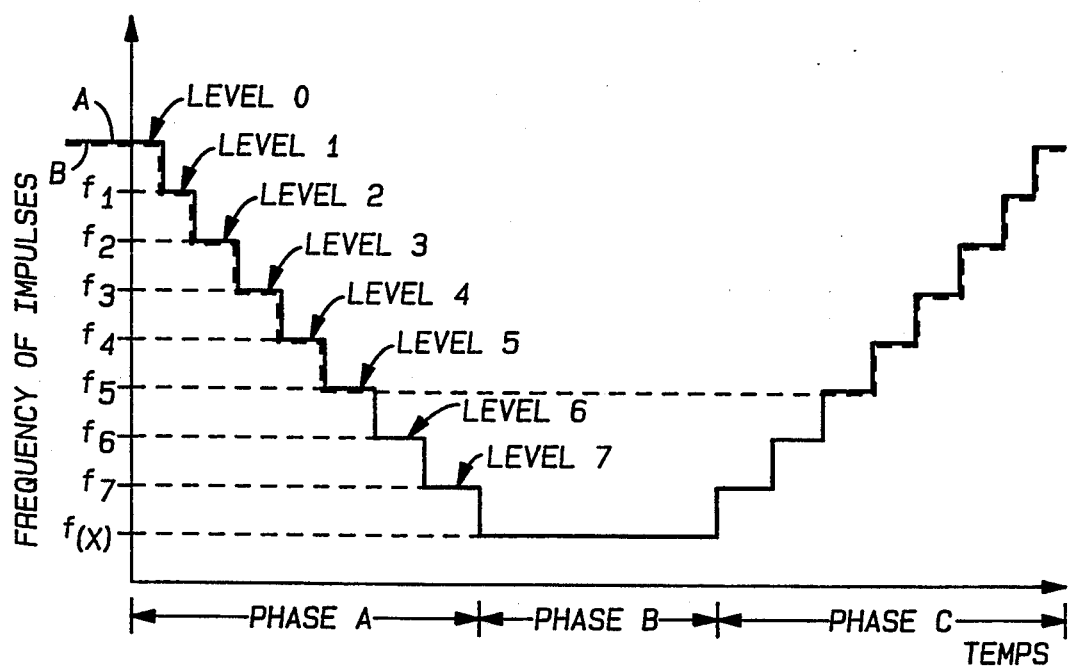
FIG. 5 is table illustrating the relationship between radius of curvature and pulse frequency in the machining of an arc over successive variations.

When the wire has run computed distance $l_o$ as indicated above, the computing unit then sends a signal to numerical control unit 129 so that the latter actuates an initial increase $Q_1$ in frequency and $Q_2$ in injection pressure, after having completed a first step; the frequency and injection pressure are incremented by quantities $Q_1$ and $Q_2$ over 8 successive variations for frequency and 7 successive variations for injection pressure, according to 8 successive steps (see FIG. 5, curve A).

On each of these increases, $\overline{Um}$ and Usa increase, then, as the gap decreases subsequent to wire feed, voltage $\overline{Um}$ stabilizes at value $\overline{Umr}$. As soon as Usa=O, the corresponding step is completed, and the parameters are incremented again.

We shall now describe machining of an arc (see FIG. 3). The arc in question has a radius of curvature of 1.26 mm. The procedure is the same as that described above, involving decrementing and incrementing the pulse frequency by quantity $Q_1$ over 5 succesive variations (according to the table providing the relation between the radius of curvature and the low frequency) and the injection pressure by quantity $Q_2$ over 4 successive variations, therefore completing 6 steps (see FIG. 5, curve B).

This equation, already stored on element 17, has also enabled element 20 of computing unit 14 to select an appropriate value for frequency and low pressure automatically, and send off signals corresponding to the number of steps desired. In the case of an edge or angle, quantities $Q_1$ and $Q_2$ computed above remain the same. At the end of the last step, as soon as Usa=Usa/ref, and before restarting part-wire relative movement, element 20 of computing unit 14 sends a signal to unit 19 of the numerical control to activate the path at low rate.

It is particularly surprising that, although no predetermined time had been assigned to the rate variation values (as in the Swiss patent demand 99/89), machining of an angle or an arc is not faster when the variations in rate are made in steps of fixed duration as described in Swiss patent demand 99/89. Thus, to machine an angle of 90 in a part of 80 mm, when the frequency is decreased, then increased every 7.5 seconds, the execution time is 121 seconds. By proceeding according to the present invention, the time is only 47 seconds. The distance $l_o$ was the same in both cases.

When the part is not too thick, instead of decreasing injection pressure down to P/8, it is even possible to machine the arc or angle at null injection pressure. In this case, $Q_2 = P/7$.

In this example, the variations in the parameters are made by quantities $Q_1$ and $Q_2$ which are equal for each step, but it is also possible to vary these from one step to the next.

Another advantage of this invention is the simplification it provides, both from the equipment and programming viewpoints. It is no longer necessary to regulate the sparking distance subsequent to variations imposed on pulse frequency, as the machining operation described in CH 654.233, for example, demanded.

The parameter automatic variation procedures of the present invention are much simpler than those described in the state of the art, for example in EP 67 876: detection of wire slack and the width of the slot (gap) cut (calling for stopping of machining) and calculation of a low speed according to a formula in which the radius of curvature, the gap and slack intervene, the latter depending on the type wire, the thickness of the part, the distance between the wire guides, the injection pressure, the machining power, and the wire mechanical tension, etc. The procedures, according to the present invention, do not require any stoppage of machining and do not require a special circuit with sensors enabling slack and gap to be measured. These procedures are independent of most of these factors, and in particular of the thickness of the part and wire slack. These procedures do not call for a variation in feed rate. Moreover, they do not call for correction of the trajectory stored to compensate for faults in geometry due to wire slack.

These procedures offer another advantage: they can easily be combined with other strategies such as the protection strategies-used to reduce machining rate when, for example, there is a risk of wire breakage, and reestablishment of this rate as soon as the risk has disappeared, such as those described in Swiss patent demand 100/89).

Conflict may occur when two small radii of curvature follow each other or, for example, when a curve of this type follows an angle very closely. Here again, this invention enables the overlap of the two automated devices to be adjusted very simply. In fact, each automated device comprises 3 easily dissociable phases: compensation of slack in the stationary machining mode by decreasing the rate in steps (phase A); a path at low speed over a given length (phase B), followed by a return to the initial rate, in steps (phase C). Each of phases A and C can be interrupted or engaged on any one of the steps.

For example, the wire may be located at the apex of an angle or at the entry of a short radius curve, while the machining rate has already been reduced to a value $V(x)_1$, subsequent, for example, to a risk of wire breakage. The low rate at which the angle or apex is to be machined n corresponds to a value $V(x)_2$ this parameter.

If $V(x)_2 < V(x)_1$, the parameter is reduced until it reaches $V(x)_2$, but starting from a step corresponding to the present value of the parameter instead of step O corresponding to its initial value V; $(V(x)_1$ becomes an upper return to rate limit.

If $V(x)_2 > V(x)_1$: the reduction programmed for machining of the angle or curve is cancelled, since the parameter is already sufficiently low; wire feed is not stopped, and phase B is proceeded to directly. Value V(x) becomes an upper limit for the protection procedure.

The wire can also be at the apex of a triangle or the entry to a small radius curve, while the machining rate, which was decreased beforehand subsequent to a risk in wire breakage or machining of a previous curve, is increasing The parameter offers a present value $V(x)_3$.

If $V(x)_2 < V(x)_3$: the procedure in course is stopped, the wire feed is stopped and the parameter is reduced until it reaches $V(x)_2$, but starting from a step corresponding to present value $V(x)_3$ of the parameter instead of step O, corresponding to its initial value V;

If $V(x)A_2 \geq V(x)_3$: the automated procedure for phase A (reduction in stationary machining rate before machining the angle or curve) is cancelled, and $V(x)_2$ becomes the limit of increase in rate imposed by the procedure already in course; since the parameter has already reached (and even exceeded) the desired value, phases B and C are proceed with immediately to machine the angle or curve.

The present invention can be used not only to vary the machining conditions so as to machine an angle or arc at an appropriate machining rate, but also to stop or continue a machining operation if, for example, there is a voluntary stoppage of a reduction in rate subsequent to the appearance of a risk or breakage or short-circuits. In particular, this invention prevents short-circuits when restarting a machining operation.

We claim:

1. A device for an EDM machine, said EDM machine cutting an electrode-workpiece along a predetermined trajectory with a wire-electrode and having
   a generator connected between the workpiece and the wire and emitting voltage pulses;
   a numerical control unit for controlling the relative movements between the workpiece and the wire and for controlling machining parameters;
   a programmed computing unit
   1) to calculate the points on the trajectory at which the wire-electrode reaches the apex of an angle or approaches an arc and to detect that the wire reaches one of these points;
   2) to send corresponding signals to the numerical control unit for stopping the relative movement between the wire-electrode and the workpiece, and for initiating the variation of at least one machining parameter from its initial value V to a predetermined final value V';
   3) to send further signals to the numerical control unit for restarting the relative movement between the wire-electrode and the workpiece and controlling said parameter by maintaining it at said final scheduled value V';
   4) to detect that a predetermined distance lo of said trajectory has been run while said parameter remaining at said final value V' and to send corresponding signals to the numerical control unit for initiating the return of said machining parameter to its initial value V;
   said device comprising:
   means connected to said programmed computing unit and numerical control unit for performing stepped variations of said at least one machining parameter in a manner that the durations of these steps are slaved to the fluctuations of a pilot factor which gives an image of the machining gap, said means for performing stepped variations comprising:
   a data processing element memorizing a predetermined number of steps and the predetermined values of each elementary variation;
   a measurement circuit controlling and determining continuously the fluctuations of said pilot factor; and
   a comparison circuit connected to said measurement circuit and data processing element, comparing continuously the value of said pilot factor to a predetermined reference threshold and sending corresponding signals to the numerical control unit and to the programmed computing unit for either starting an elementary variation of said at least one machining parameter or for stopping said variation when said at least one machining parameter has reached its final value V' or has returned again to its initial value V or when a predetermined number of steps have been performed.

2. The device according to claim 1, in which said at least one machining parameter is the frequency of the voltage pulses emitted by the generator.

3. The device according to claim 2, wherein said means for providing stepped variations of at least one machining parameter comprises an injection pressure at which the machining fluid is injected into the machining gap.

4. The device according to claim 3, which further comprises a bank of solenoid valves connected to the numerical control unit as actuators to activate variations of said injection pressure by predetermined elementary quantities.

5. The device according to claim 1, in which the elementary variations of said at least one machining parameter which are memorized by said data processing element have a constant value.

6. The device according to claim 1, in which said measurement circuit to control and determine continuously the fluctuations of said pilot factor is a circuit to measure the machining voltage Um existing between the workpiece and the wire-electrode.

7. The device according to claim 6, in which said measurement circuit is further provided with means for determining a mean value Um for the machining voltage and for calculating a difference Usa between said mean value and an average reference voltage Umr, said difference Usa being said pilot factor.

8. The device according to claim 7, in which said measurement circuit further comprises means for integrating the value of said difference Usa over a predetermined period of time.

9. A control process for an EDM machine which is cutting an electrode-workpiece along a predetermined trajectory with a wire-electrode, so as to vary in a first direction at least one machining parameter from its initial value up to a predetermined final value when the wire-electrode reaches the apex of an angle or approaches an arc, said at least one machining parameter returning from said final value to its initial value V at the end of cutting of the angle or arc, said variation being stepped variations performed in a manner that the durations of the steps are slaved to the fluctuations of a pilot factor which gives an image of the machining gap, said control process comprising the stages of:
   calculating the points of said trajectory at which the wire-electrode reaches the apex of an angle or approaches an arc;

stopping the relative movement between the wire-electrode and the workpiece and initiating the variation of said at least one machining parameter from its initial value to said predetermined final value when the wire reaches one of these points;

continuously determining the fluctuations of said pilot factor and comparing continuously its value to a predetermined reference threshold;

when said value of said pilot factor reaches said reference threshold, varying the value of said at last one machining parameter by a predetermined elementary quantity, said elementary variation step causing in turn a further variation of said pilot factor;

further varying in steps said at least one machining parameter by predetermined elementary quantities until it is detected either that it has reached its final scheduled value or that a predetermined number of steps have been performed;

restarting the relative movement between the wire-electrode and the workpiece and maintaining said parameter at said final scheduled value;

when a predetermined distance lo of said trajectory has been run while said parameter is at said final value, initiating the variation in opposite direction of said machining parameter anew by successive elementary variation steps, the durations of which are slaved to the fluctuations of said pilot factor, until it is detected either that said parameter has returned again to its initial value or that a predetermined number of steps have been performed.

10. The process according to claim 9, in which the successive stepped variations by elementary quantities or increments and decrements, applied to said at least one machining parameter are all equal.

11. The process according to claim 9, in which the predetermined reference threshold to which is continuously compared said pilot factor, is the value of said factor corresponding to machining along a straight line.

12. The process according to claim 9, in which said machining parameters which are made to vary are the frequency of the voltage pulses emitted by the generator and the injection pressure at which the reechoing fluid is injected into the gap.

13. The process according to claim 9, in which said pilot factor which is continuously determined and compared to a reference threshold is the difference Usa between an average reference voltage Umr and a mean value of the machining voltage Um existing between the workpiece and the wire-electrode, said machining voltage being continuously measured.

14. The process according to claim 9, in Which said predetermined distance lo of said trajectory which is to be run while said machining parameter remains at said final value is equal to:

$$lo = \frac{R + g}{\tan \alpha/2}$$

where r is the radius of the wire, g the sparking distance, $\alpha$ the value of the angle to be cut.

15. The process according to claim 9, in which said predetermined distance lo of said trajectory which is to be run while said machining parameter remains at said final value is equal to:

$$lo = \gamma r,$$

where y is the value in radians of the angle corresponding to the arc to be cut, and r being the radius of curvature of this arc.

* * * * *